(12) United States Patent
Kiesewetter et al.

(10) Patent No.: US 7,872,569 B2
(45) Date of Patent: Jan. 18, 2011

(54) BUILT-IN INSTRUMENT CLUSTER

(75) Inventors: Thomas Kiesewetter, Braunschweig (DE); Paolo Vaz, Weyhausen (DE); Niclas Meyer, Lehve (DE); Gustav Hofmann, Braunschweig (DE); Helge Neuner, Wottenbüttel (DE); Robert Hofmann, Berlin (DE); Ralf Wenzel, Meine (DE)

(73) Assignee: Volkswagen AG, Wolfsburg (DE)

( * ) Notice: Subject to any disclaimer, the term of this patent is extended or adjusted under 35 U.S.C. 154(b) by 645 days.

(21) Appl. No.: 11/547,843

(22) PCT Filed: Mar. 31, 2005

(86) PCT No.: PCT/EP2005/003404

§ 371 (c)(1),
(2), (4) Date: Jul. 30, 2007

(87) PCT Pub. No.: WO2005/098513

PCT Pub. Date: Oct. 20, 2005

(65) Prior Publication Data
US 2009/0278676 A1 Nov. 12, 2009

(30) Foreign Application Priority Data

Apr. 5, 2004 (DE) .................. 10 2004 017 249
Mar. 17, 2005 (DE) .................. 10 2005 012 848

(51) Int. Cl.
*B60Q 1/00* (2006.01)
(52) U.S. Cl. .................. 340/461; 340/815.78
(58) Field of Classification Search .................. 340/438, 340/461, 464, 466, 472, 815.47, 815.5, 815.74, 340/815.78; 345/7, 167, 168; 359/13, 15
See application file for complete search history.

(56) References Cited

U.S. PATENT DOCUMENTS 4,636,782 A  1/1987  Nakamura et al.

(Continued)

FOREIGN PATENT DOCUMENTS

DE  195 27 090  1/1997

(Continued)

OTHER PUBLICATIONS

International Search Report, PCT International Patent Application No. PCT/EP2005/003404, dated Jul. 5, 2005.

(Continued)

*Primary Examiner*—Van T. Trieu
(74) *Attorney, Agent, or Firm*—Kenyon & Kenyon LLP

(57) ABSTRACT

A built-in instrument cluster for a motor vehicle includes at least one display device, which emits image-forming light and is arranged in the direct field of view of an observer, and at least one illuminated and/or self-illuminating electromechanical indicator device, which is arranged in the observer's field of view, at an angle to the display device, and is moved into the observer's field of view together with the display device via an optical combiner, which is arranged to reflect the image-forming light of the electromechanical indicator device. In order to be able to integrate such an instrument cluster into the tight spatial conditions in the instrument panel in the steering-column region, it is provided that the electromechanical indicator device is at least partially provided by light guides and/or light projectors to save depth at abutting vehicle components.

16 Claims, 4 Drawing Sheets

U.S. PATENT DOCUMENTS

| | | | | |
|---|---|---|---|---|
| 5,329,272 | A | * | 7/1994 | Massarelli et al. .......... 340/461 |
| 5,825,338 | A | * | 10/1998 | Salmon et al. ................. 345/7 |
| 6,317,037 | B1 | | 11/2001 | Ayres et al. |
| 6,714,125 | B2 | * | 3/2004 | Furuya et al. ............... 340/438 |
| 6,906,836 | B2 | * | 6/2005 | Parker et al. .................. 359/15 |
| 2002/0001185 | A1 | | 1/2002 | Wilhelm et al. |
| 2003/0090886 | A1 | | 5/2003 | Eckardt et al. |

FOREIGN PATENT DOCUMENTS

| | | |
|---|---|---|
| DE | 195 34 020 | 3/1997 |
| DE | 199 04 597 | 10/1999 |
| DE | 101 54 227 | 5/2003 |
| EP | 0 482 805 | 10/1991 |
| EP | 0 945 710 | 9/1999 |
| EP | 1 079 209 | 2/2001 |
| GB | 2 266 375 | 10/1993 |
| JP | 2002079848 | 3/2002 |
| WO | WO 03/102667 | 12/2003 |

OTHER PUBLICATIONS

International Preliminary Report on Patentability and Written Opinion of the International Searching Authority, PCT International Patent Application No. PCT/EP2005/003404, dated Nov. 14, 2006 (English-language translation provided).

Search Report, German Patent Application No. 10 2005 012 848.3, dated Mar. 17, 2005.

* cited by examiner

BUILT-IN INSTRUMENT CLUSTER

FIELD OF THE INVENTION

The present invention relates to a built-in instrument cluster for a motor vehicle having at least one display device that emits image-forming light, and at least one illuminated or self-illuminating electro-mechanical indicator unit.

BACKGROUND INFORMATION

The multitude of information that is indicated to a vehicle driver due to the growth in the number of comfort systems such as navigation systems, telecommunication devices, driver-assistance systems as well as warning messages, etc., is increasing steadily. As a result, many vehicles are already provided with so-called multi-function operating devices, which are disposed in the center of the console, in particular. Given such an arrangement, in order to receive the information, the driver is forced to take his eyes away from the traffic. For this reason, at least a portion of the information is preferably displayed in the instrument cluster arranged in the driver's field of view in the driving direction. Under these circumstances the problem arises that only a certain display area in the instrument cluster is available, besides the analog display elements for speed, rotary speed, etc.

New arrangements for instrument clusters, which are able to display a larger variety of information without dispensing with the usual analog display instruments, are therefore under development.

European Published Patent Application No. 0 482 805, for example, describes an instrument cluster in which a first and a second image source are provided. An image-forming illumination of the first image source is reflected to the observer by a planar combination device and two additional mirrors located in the beam path of the reflected light.

The image-forming illumination of the second image source is transmitted by the combining device, and then also reflected to the observer by the two mirrors. The first image source may include a group of electromechanical indicator devices such as for speed, oil pressure, gas level, and display-panel lights such as the turn signal indictor, high beam and emergency indicators. The second image source is arranged as a liquid crystal display to provide alphanumeric information, such as messages, maintenance instructions and settings for the environment. In this instrument cluster, neither of the two image sources is in the driver's direct visual field, so that a purely virtual image is created. Furthermore, in such an instrument cluster, it is difficult to control the parallaxes so as to prevent image distortions, the parallaxes being caused by the different locations of the image sources and the multiple reflections of the image-forming light of the image sources.

Moreover, Japanese Published Patent Application No. 2002-79848 describes an instrument cluster for a motor vehicle having a conventional electromechanical indicator device into whose display image a virtual image of a display device, which is not arranged within the vehicle driver's field of view, is reflected via a concave, semitransparent mirror, which is arranged to pass through the image-forming light of the electromechanical indicator device. However, using this indicator device, it is not possible to overcome the problem of conventional indicator devices, i.e., displaying a greater variety of different information in a rapidly comprehensible manner for the vehicle driver, since space for the reflected image of the display device must be reserved in the electromechanical indicator device.

SUMMARY

According to an example embodiment of the present invention, a display device, which may be arranged as a liquid crystal display, OLED display or any other display of this type, is arranged in the viewer's field of view. Another electromechanical indicator device is arranged outside of the vehicle driver's field of view, at an angle to the display device. An optical combiner to assemble the image-forming light of the display device and the electromechanical indicator device into a shared display image is arranged between the display device and the electromechanical indicator device. The combiner for the image-forming light of the display device is selected to be transparent and furthermore arranged such that it reflects the image-forming light of the electromechanical indicator device. These measures allow a greater variety of information to be displayed in an organized manner in different display modes for a motor vehicle. Since the electromechanical indicator device is arranged below the viewer's field of view, this instrument cluster requires additional space at a location within the dashboard where so far no space has been required for instrument clusters. There is therefore a need to further develop the instrument cluster such that it is able to be accommodated in the limited space of a dashboard.

Example embodiments of the present invention provide a built-in instrument cluster that, despite the use of a display device and a mechanical indicator device, is so compact that it is able to be installed in the limited space of a dashboard within the region of the steering column.

Accordingly, to save depth space for the vehicle components abutting the display device, the electromechanical indicator device at least partially includes light guides and/or light projectors. The indicator device may include at least one pointer instrument. Depending on the placement of the pointer instrument within the built-in instrument cluster, different regions of the pointer instrument may be realized by light guides.

The indicator elements of the pointer instrument, i.e., its pointer and display markings, may include light guides. The ring edge of the pointer instrument may include light guides as well. In order to reduce the depth, the light source for feeding light into the light guides may include LEDs.

The indicator elements of the pointer instrument may be at least partially realized by light projectors. For example, the graphic symbols of a cover disk of the pointer instrument, i.e., the dial plate, may be produced using light projectors. A light projector may include an LED and a reflecting element, the reflecting element including, e.g., two reflectors. For example, the reflectors may have optical image-forming characteristics and be arranged as concave mirrors, for example, in order to achieve optical imaging.

The LEDs for feeding light into the light guides or for operating the light projector may be arranged on a mounting board underneath the dial plate of the pointer instrument. Overall, such a combination of LEDs and mounting board may require less depth space than conventional light sources.

The installation of the cluster instrument in the dashboard of a motor vehicle is problematic due to the control panel cross member abutting on the rear side of the instrument cluster, the steering column connection in the region of the front edge of this member, and the steering column itself. A special problem in this context is not the display device, which may be positioned directly adjacent to the control panel cross member, but the horizontally positioned electromechanical indicator device, which may have a substantially conventional design. Especially problematic in this context is that the clearance between the built-in instrument cluster and the steering-column connection and the actual steering wheel should be as short as possible in order to avoid resonant frequencies. This is in conflict with the additional requirement that the instrument cluster should have a specific depth in order to be able to provide the pointer instrument of the electromechanical indicator device and to provide a reflected image that is satisfactory from the standpoint of design and ergonomics. The reflected pointer instrument should optically float in front of the display device, so to speak, i.e., it should have a specific clearance with respect to this display device. This clearance implies a reduced depth of the electromechanical indicator device, in addition to the reduced installation space due to the steering-column connection.

For this reason, the part of the pointer instrument provided by light guides comes to lie in a circumferential edge region of the pointer instrument pointing to the display device in order to save depth there for the steering-column connection, and to provide the required clearance with respect to the display device. This measure allows the built-in instrument cluster to nestle against the steering-column connection, so to speak.

Both with a view to information variety as well as design-related requirements, the electromechanical indicator device may include two pointer instruments positioned on both sides of a steering column. Because of this instrument placement, which may be advantageous from the standpoint of ergonomics, and because of the limited available installation width, it is not fully possible to arrange the two instruments with sufficient lateral clearance so that they do not interfere with the steering column. The pointer instruments may be shifted closer to the steering column, such that the two pointer instruments at least partially overlap the steering column in the circumferential edge region. In the area of these circumferential edge regions, the pointer instruments are provided by light guides in order to save depth there for the steering column.

Due to the reflecting by the electromechanical indicator device, which is arranged outside the observer's field of view, with the aid of the combiner, and the representation of the display device via the combiner, the angle between the combiner and the display device as well as the combiner and the electromechanical indicator device should have approximately the same size. These angles may amount to 40° each, i.e., 80° altogether. In view of this, and since a steering-column gradient of at least 20°, e.g., 21 to 25°, and, e.g., 23.5°, should be provided, the display device and the electromechanical indicator device may be brought into the desired orientation with the aid of a rotary and/or tilting adjuster device.

In the following text, example embodiments of the present invention are described in greater detail with reference to the appended Figures.

DETAILED DESCRIPTION

Figure 1:
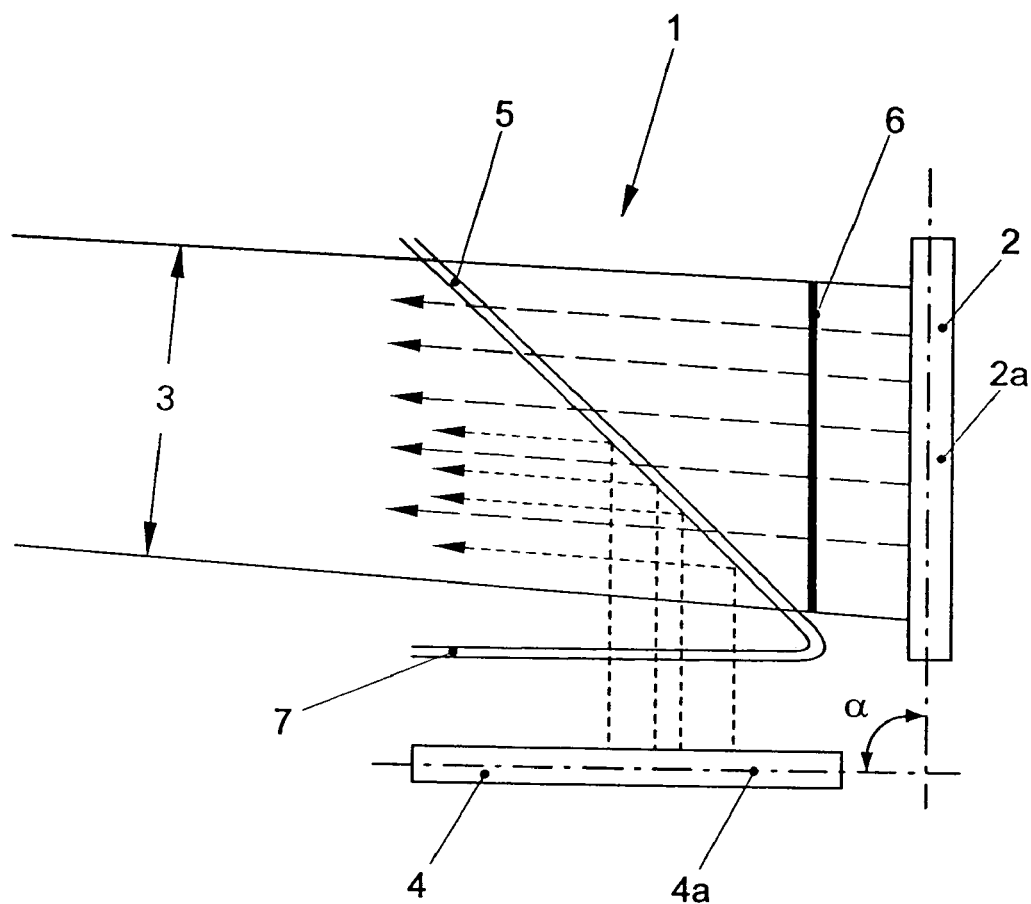
FIG. 1 is a schematic cross-sectional view illustrating the configuration of the built-in instrument cluster according to an example embodiment of the present invention.

Instrument cluster 1 for a motor vehicle shown in FIG. 1 includes a display device 2, which is arranged in the region of a steering wheel in the direct field of view 3 of a vehicle driver when driving the vehicle, and an electromechanical indicator device 4, which is arranged below the driver's field of view 3. Electromechanical indicator device 4 may be a pointer instrument or a plurality of pointer instruments, e.g., in the form of dial-type gauges whose scales or dial plates are arranged to be self-illuminating or illuminated and which may have an illuminated or self-illuminating pointer to indicate the actual value. Furthermore, electromechanical indicator device 4 may include one or a plurality of luminous area displays for warning messages, warning lights, etc.

Center axes 2a and 4a of display device 2 and electromechanical indicator device 4 may be arranged at an angle a of, e.g., 80° to each other. Disposed at an angle of 45° to the indicator device is a combiner 5. This may be a planar, semi-transparent mirror which lets the image-forming light of display device 2 pass through, so that an observer is able to perceive the display light of display device 2 directly. The image-forming light of electromechanical indicator device 4 is reflected by semitransparent mirror 5, so that, to an observer, the display image of display device 2 appears as a virtual image 6 superposed to the display image of display device 2. A diaphragm 7 made of semitransparent material may be provided above electromechanical indicator device 4, which is arranged to transmit the image-forming light of the indicator device and which covers electromechanical indicator device 4, as far as the observer is concerned, at least in the deenergized state.

Figure 2:
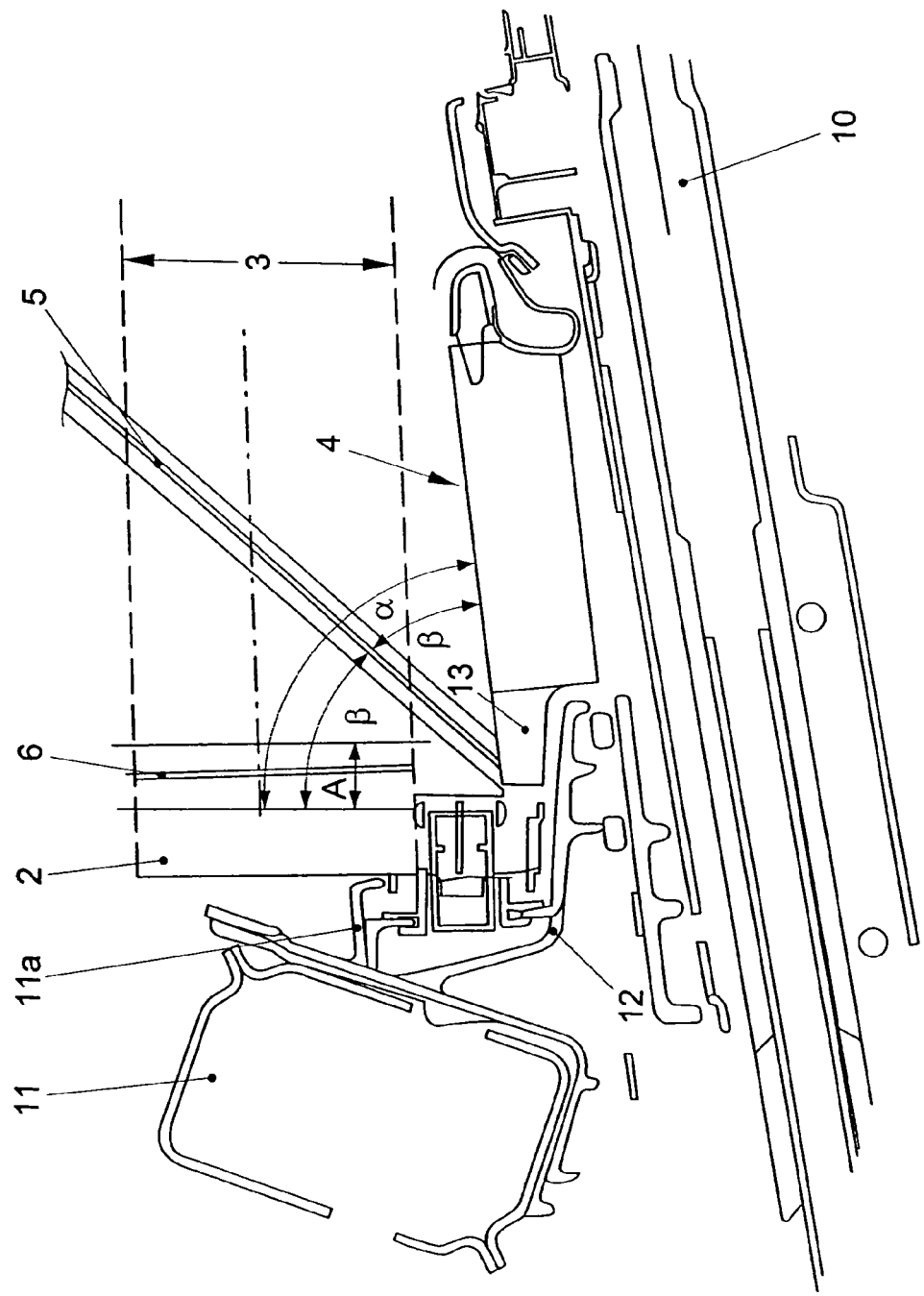
FIG. 2 is a cross-sectional view of the combination display device illustrated in FIG. 1 installed in a dashboard in the region of the steering column.

FIG. 2 is a cross-sectional view of the placement of the main components of the built-in instrument cluster illustrated in FIG. 1 relative to components of the motor vehicle in the region of the installation location above steering column 10.

As illustrated in FIG. 2, the installation space for instrument cluster 1 is very tight in this location behind the dashboard. Arranged behind the installation location of display device 2 of instrument cluster 1 is a control panel crossmember 11 having a member profile element 11a that projects towards display device 2. Since the conventional instrument cluster usually comes to be arranged at the location of display device 2 as well, the required space for display device 2 is indeed problematic with respect to control panel crossmember 11, but not as critical as the position of mechanical indicator device 4 with respect to steering column 10 and the components cooperating with steering column 10. This applies, e.g., to steering-column connection 12, which extends from the rear side of display device 2, approximately next to member profile element 11a, in a downward direction and, above all, toward the front with respect to steering column 10. Due to the geometry or positioning of display device 2, indicator device 4 and combiner 5 relative to each other, as discussed earlier in connection with FIG. 1, indictor device 4, by necessity, comes to lie underneath display device 2 such that, given the front end of steering-column connection 12, there is insufficient space at least for an edge region 13 of indicator device 4 pointing toward display device 2. Indicator device 4, which includes a dial-type gauge or a pointer instrument, for example, in this region, is thus unable to be provided with the required depth in the conventional manner since there is no room for it in this region 13. As a result, to save depth for steering-column connection 12 in the circumferential edge region 13, the pointer instrument arranged there at least partially provided in the form of light guides or light projectors, which have low depth and thus make it possible to arrange indicator device 4 with less depth in circumferential edge region 13 compared to the remaining region.

Also, given the limited accommodation space for instrument cluster 1, the following is pointed out with reference to FIG. 2. The clearance of instrument cluster 1 with respect to steering-column connection 12 and the actual steering wheel should be as short as possible to avoid resonant frequencies. On the other hand, a certain depth is required to be able to provide the pointer instruments of electromechanical indicator device 4 so that a satisfactory reflected imaging of these instruments is achievable. The reflected pointer instruments should optically float in front of the display device so to speak, which is why a corresponding clearance A between the front side of display device 2 and the edge of circumferential edge region 13 of indicator device 4 should be observed. The afore-mentioned tight spot between steering-column connection 12 and indicator device 4 is at this location, which is why the latter has a more shallow arrangement in circumferential edge region 13, which is able to be provided with the aid of light guides or light projectors that form a portion of the elements of indicator device 4.

Furthermore, instrument cluster 1 should be positioned such that a steering-column gradient of, e.g., at least 20°, e.g., 21° to 25°, e.g., 23.5°, is able to be provided. In addition, the angle between the semitransparent mirror, i.e., combiner 5, and display device 2, and combiner 5 and indicator device 4, should be identical. With an angle of 40° in each case, this results in an overall angle of 80°. In order to be able to install instrument cluster 1 in the dashboard in a correspondingly precise and uncomplicated manner, a shared height adjuster or rotary adjuster of display device 2 and indicator device 4 may be provided together with combiner 5.

Figure 3:
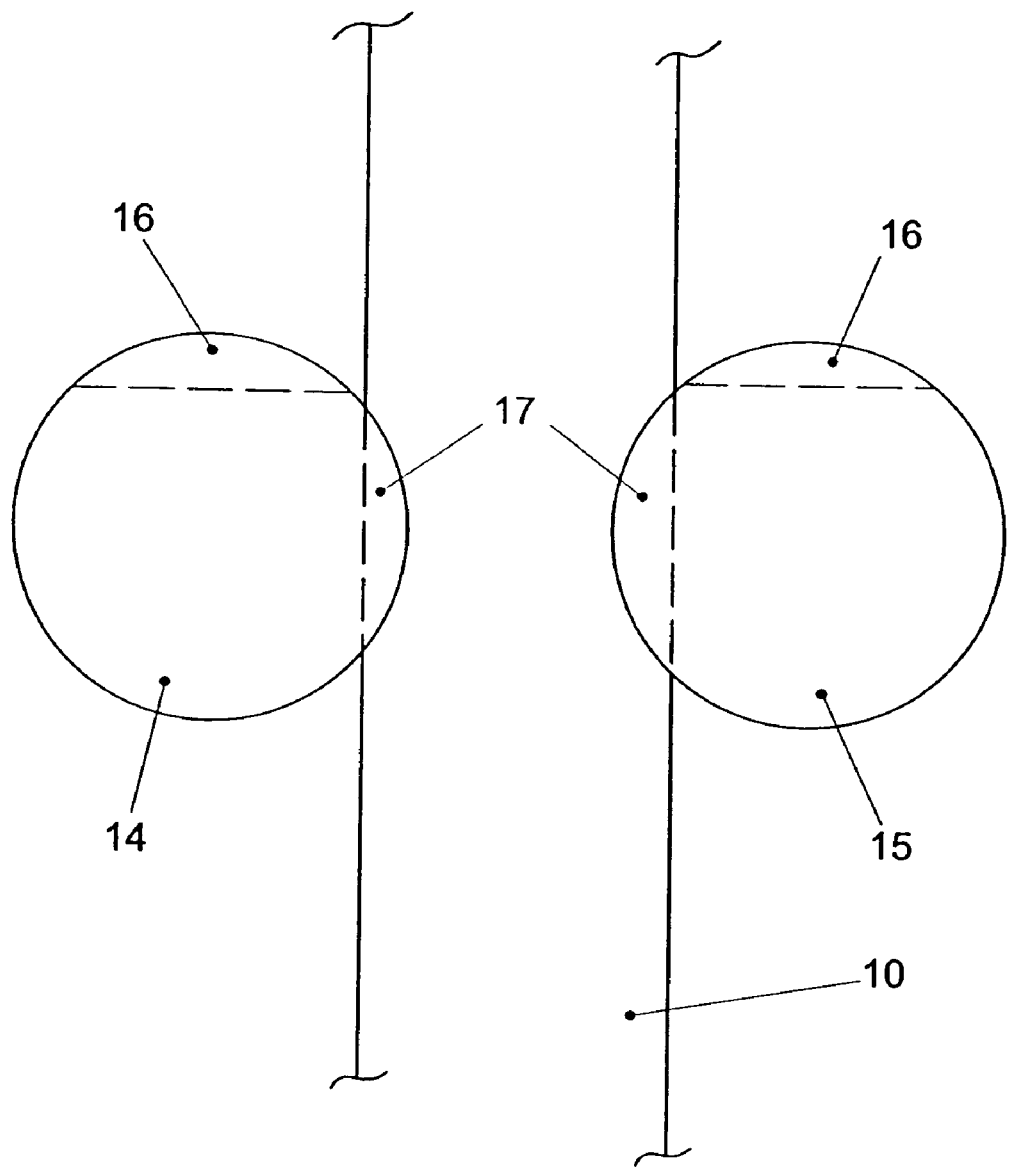
FIG. 3 is a schematic view of the placement of the electromechanical indicator device, including two pointer instruments, of the instrument cluster with respect to the steering column of a motor vehicle.

FIG. 3 illustrates the fitting of electromechanical indicator device 4 with two dial-type instruments or pointer instruments 14 and 15, which assume the position illustrated in FIG. 2 relative to steering column 10. Since both pointer instruments 14 and 15 come to lie in instrument cluster 1 at a mutual lateral offset, and since instrument cluster 1 may have only a specific width whereas pointer instruments 14 and 15 have a relatively large diameter for good readability, pointer instruments 14, 15 come to lie such that they overlap steering column 10 at least by edge regions 16 and 17 facing each other. The available space in this location is as limited as in the case of circumferential edge region 13, so that pointer instruments 14, 15 are provided by light guides or light projectors in regions 16 and 17 in order to leave more room for steering column 10.

Figure 4:
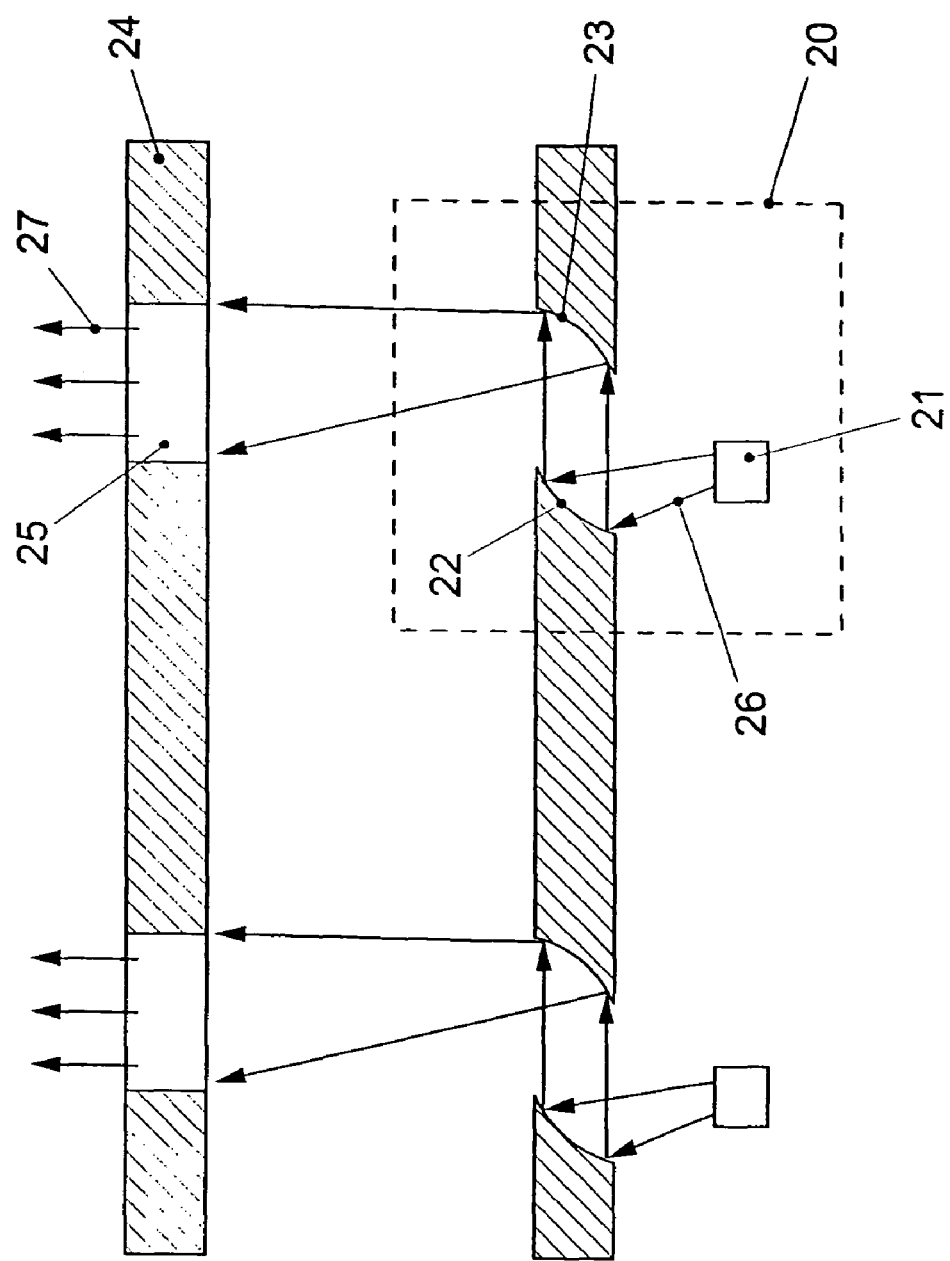
FIG. 4 is a schematic view of another possibility of illuminating the scales or dial plates with the aid of light projectors.

FIG. 4 is a schematic representation of the use of light projectors to reduce the depth of the electromechanical indicator device. A light projector 20 for saving depth space includes a light source 21, e.g., an LED, and a reflecting element made up of two oppositely positioned reflectors 22 and 23, which are arranged as concave mirrors, for example, to achieve corresponding optical imaging. The reflecting element images light 26 emitted by LED 21 onto a cover plate 24 provided with graphic symbols 25, e.g., a dial plate, so that symbol 25 is luminous and emits light 27 to the observer. Dial plate 24 may be arranged in a conventional manner underneath the pointer of the indicator device, i.e., the dial-type gauge.

LIST OF REFERENCE CHARACTERS

1 instrument cluster
2 display device
2a center axis
3 field of view
4 indicator device
4a center axis
5 combiner
6 virtual image
7 diaphragm
10 steering column
11 control panel crossmember
11a member profile element
12 steering-column connection
13 circumferential edge region
14 pointer instrument
15 pointer instrument
16 circumferential edge region
17 circumferential edge region
20 light projector
21 LED
22 reflector
23 reflector
24 dial plate
25 graphic symbol
26 emitted light of LED
27 symbol light

What is claimed is:

1. A built-in instrument cluster for a motor vehicle, comprising:
at least one display device adapted to emit image-forming light and arranged in a direct field of view of an observer;
at least one electromechanical indicator device that is at least one of (a) illuminated and (b) self-illuminating arranged in the observer's field of view, at an angle to the display device; and
an optical combiner adapted to move the indicator device into the observer's field of view together with the display device, the optical combiner adapted to reflect the image-forming light of the electromechanical indicator device;
wherein, to save depth space for vehicle components abutting the electromechanical indicator device, the electromechanical indicator device at least partly includes at least one of (a) light guides and (b) light projectors.

2. The instrument cluster according to claim 1, further comprising at least one pointer instrument that at least partially includes at least one of (a) light guides and (b) light projectors.

3. The instrument cluster according to claim 2, wherein display elements of the pointer instrument include light guides.

4. The instrument cluster according to claim 2, wherein display elements of the pointer instrument include light projectors.

5. The instrument cluster according to claim 4, wherein graphic symbols of a cover plate of the pointer instrument are generated by light projectors.

6. The instrument cluster according to claim 2, wherein a ring edge of the pointer instrument includes light guides.

7. The instrument cluster according to claim 2, wherein a part of the pointer instrument that includes light guides is arranged in a circumferential edge region of the pointer instrument pointing toward the display device to save depth for a steering-column connection.

8. The instrument cluster according to claim 1, wherein the light projector includes an LED and a reflecting element.

9. The instrument cluster according to claim 8, wherein the reflecting element includes two reflectors.

10. The instrument cluster according to claim 1, further comprising a light source adapted to feed light into the light guides, the light source including LEDs.

11. The instrument cluster according to claim 10, wherein the LEDs are arranged on a mounting plate of a pointer instrument.

12. The instrument cluster according to claim 1, wherein the electromechanical indicator device includes two pointer instruments arranged on both sides of a steering column.

13. The instrument cluster according to claim 12, wherein the two pointer instruments are arranged at a clearance that substantially corresponds to a diameter of the steering column.

14. The instrument cluster according to claim 12, wherein, the steering column includes a round diameter, a clearance of the pointer instruments is smaller than the diameter of the steering column, circumferential edge regions of the pointer instruments overlapping the steering column including at least one of (a) light guides and (b) light projectors to save depth space for the steering column.

15. The instrument cluster according to claim 1, wherein the optical combiner includes a semitransparent mirror, the display device being arranged behind the mirror in a viewing direction of the observer, the electromechanical indicator device arranged below the mirror.

16. The instrument cluster according to claim 1, further comprising at least one of (a) a rotating device and (b) a tilting adjuster device for the display device and the electromechanical indicator device.

* * * * *